United States Patent [19]

Kondo et al.

[11] Patent Number: 4,502,134
[45] Date of Patent: Feb. 26, 1985

[54] OPTICAL DISC SIGNAL REPRODUCING SYSTEM WITH TILT IMMUNIZATION

[75] Inventors: Mitsushige Kondo; Kazuo Okada; Kazuo Hirasawa, all of Nagaokakyo, Japan

[73] Assignee: Mitsubishi Denki Kabushiki Kaisha, Tokyo, Japan

[21] Appl. No.: 393,944

[22] Filed: Jun. 30, 1982

[30] Foreign Application Priority Data

Jul. 16, 1981 [JP] Japan ............................... 56-111630

[51] Int. Cl.³ .............................................. G11B 7/00
[52] U.S. Cl. ..................................................... 369/46
[58] Field of Search ................... 250/201; 369/44, 45, 369/46, 111, 124, 109, 110

[56] References Cited

U.S. PATENT DOCUMENTS

| | | | |
|---|---|---|---|
| 4,243,848 | 1/1981 | Utsumi | 369/45 |
| 4,338,682 | 7/1982 | Hosaka et al. | 369/44 |
| 4,406,000 | 9/1983 | Shoji et al. | 369/44 |
| 4,414,655 | 11/1983 | Shoji et al. | 369/44 |

*Primary Examiner*—Donald McElheny, Jr.
*Attorney, Agent, or Firm*—Sughrue, Mion, Zinn, Macpeak and Seas

[57] ABSTRACT

An optical signal reproducing system uses laser light reflected from a recording disc track 12 to recover signals stored in pits 13 separated by lands. The differential output of the reflected light only when the focused beam is incident on pits is used to control lateral tracking offset correction in a negative feedback mode, thereby immunizing the system from false tracking correction due to light reflected from lands when the disc is tilted from the optical axis.

5 Claims, 20 Drawing Figures

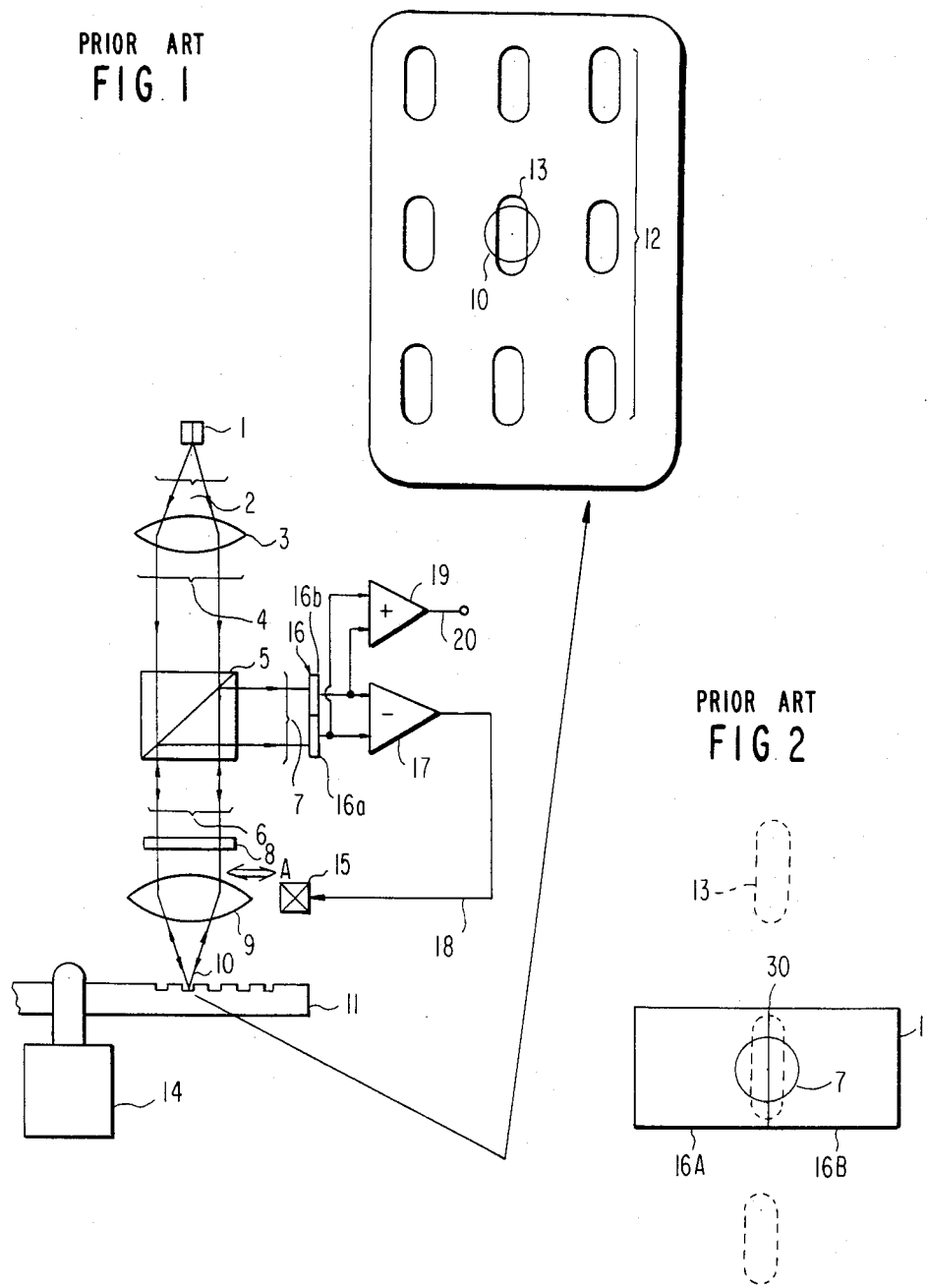

(SUMMING AMPLIFIER 19)

(PULSE GEN 21)

(GATES 22, 23)

(HOLD CKTS. 24, 25)

FIG. 10
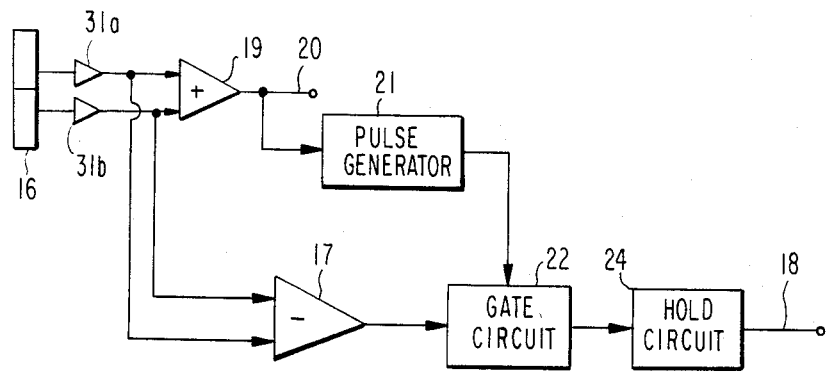
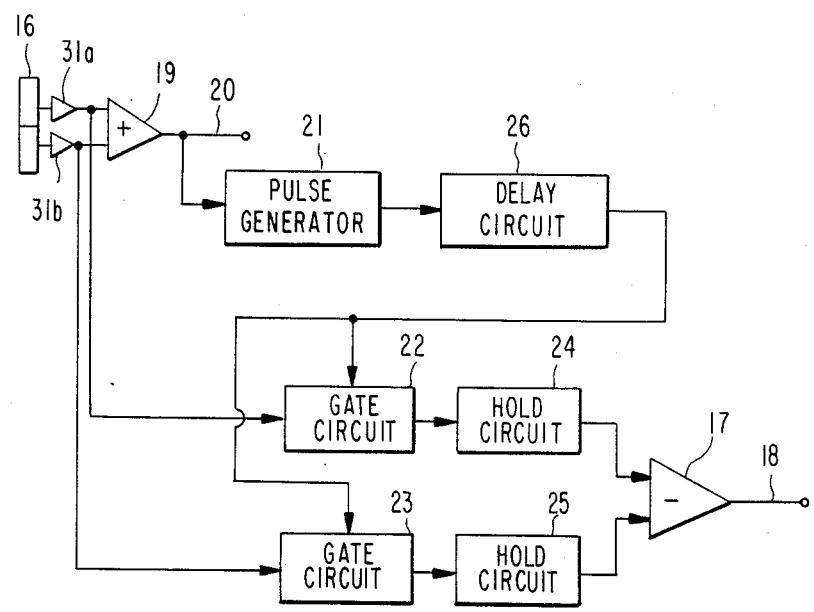
FIG. 11

OPTICAL DISC SIGNAL REPRODUCING SYSTEM WITH TILT IMMUNIZATION

BACKGROUND OF THE INVENTION

This invention relates to an optical signal reproducing system for video discs, and more particularly to a system of this kind having tilt immune means for correcting any lateral offset of the scanning beam to make it precisely follow the recording track.

In recent years, an electric signal reproducing system has been developed utilizing an optical beam as the reproducing media. A conventional optical signal reproducing system of this type is shown in FIG. 1, wherein a light source such as an He-Ne laser generates a beam 2 which is converted into a linearly polarized beam 4 by a collimating lens 3 and is incident upon a quarter-wave plate 8 through a polarized beam splitter 5. After passing through the quarter wave plate the laser light is collected into a light spot 10 on a disc 11 by a collimating lens 9. The disc 11 stores electrical signals such as TV signals, PCM audio signals and the like on its recording track composed of a series of pits 13, and is positioned near the focus of the collimating lens 9. When the light is incident upon the disc 11, the reproducing beam bearing recorded signals is reflected from the disc and reversed through its optical path to again pass through the collimating lens 9 and be polarized at the quarter-wave plate 8 by 90 degrees from the original laser light beam 6. After reaching the polarized beam splitter 5, the reflected light beam 7 advances on its optical path which is turned through an angle of 90 degrees by the beam splitter. This reflected light beam 7 is divided and converted into two electrical signals by a dual optical detector 16 having two detectors 16a and 16b, whose outputs are fed to both a summing amplifier 19 and a differential amplifier 17.

In this system, as the disc 11 is rotated by an electric motor 14, the light spot 10 traces the recording track and the reflected light is attenuated when the spot impinges on a pit 13 since the depth of the pit is chosen to be other than a multiple of a quarter-wavelength integer. On the other hand, when the spot 10 impinges on the area between the pits, or on what is termed a land, the intensity of the reflected light is greater in comparison with that for the pit. Thus, electrical signals stored in the recording track 12 in the form of pits are reproduced as the output 20 of the summing amplifier 19. If the light spot 10 is focused off of the recording track 12, however, the output on line 18 produced by the differential amplifier 17 causes a collimating lens transducer 15 to move in a direction A perpendicular to the optical axis and transverse to the recording track 12. The corrective movement of the collimating lens is substantially proportional to the amplitude of the differential output on line 18, such that the accurate or properly centered tracking of the light spot 10 will be restored.

FIG. 2 shows a reflected light beam 7 positioned on the dual optical detector 16, in which a division line 30 of the detector concides with the central line or diameter of the reflected beam, and the projection of the recording track 12 incident upon the detector is parallel with the line 30. With such an arrangement, the distribution of the light beam on the detector 16 is as illustrated in FIG. 3(a) if the optical axis is perpendicular to the disc; the light spot 10 and recording track 12 are overlapped one upon the other, and with the light spot located on a pit 13 the light beam is symmetrically distributed on both sides of the division line.

If the light spot is similarly aligned with the center line of the recording track but incident on a land, the light beam is symmetrically distributed on both sides of the light detector as shown in FIG. 3(b). If the light spot is laterally shifted from the recording track and incident on a pit, however, the light beam is distributed as shown in FIG. 3(c) whereby the detectors 16a and 16b receive different luminous intensities. If the light spot is laterally shifted from the recording track and incident on a land, the light beam distribution on both detectors is again symmetrical as shown in FIG. 3(b), with the identical light intensity incident on each detector half. Thus, only when the light spot is incident on a pit can the distribution of the reflected beam on both detectors be asymmetrical as a function of the lateral offset between the recording track and the light spot. The differential output on line 18 between the dual light detectors 16a and 16b is positive or negative according to which side the light spot is offset relative to a pit, and with the light spot on a land a zero differential output will result even with the track being offset. After low-pass filtering the differential output will vary with respect to the tracking offset as shown in FIG. 4, and if such output is impressed on the collimating lens transducer 15 with proper polarity, any offset of the light spot 10 out of the recording track 12 will be corrected. In other words, a negative feedback is applied such that the light spot will be continuously centered on the recording track.

An optical signal reproducing system as described above has a serious drawback when the optical axes of the disc 11 and collimating lens 9 are not perpendicular to each other (hereinafter referred to as the disc being tilted or listing).

FIG. 5 shows the distribution of light intensity on the dual detectors with the disc listing by 0.5°–1.5°. FIGS. 5(a) and (c) show the respective distributions in the cases of track listing but no lateral offset and track listing with lateral offset, both with the light spot positioned on a pit. FIG. 5(b) shows the distribution with the light spot positioned on a land, each of the distributions having about the same shapes as in their FIG. 3 counterparts. With reference to FIG. 5, if the light spot is positioned on a pit the differential output on line 18 due to a tracking offset will be much greater than the output due to disc listing, but if the light spot is positioned on a land a relatively large differential output is generated purely as a function of disc listing (compare the areas under the distribution curve on both sides of the ordinate in FIG. 5(b)). In the conventional system, the tracking offset correction signal on line 18 will be the mean value between the differential signal produced with the spot on a pit and the one produced with the spot on a land, whereby if the disc is not tilted no erroneous or over-correction will result. If the disc is tilted, however, the differential output generated on a land where the intensity of the reflected light is relatively large becomes an overriding factor, and since this output component is solely due to disc listing an erroneous centering correction will result even when there is no tracking offset.

SUMMARY OF THE INVENTION

The present invention overcomes this disadvantage by providing an optical signal reproducing system in which laser light reflected from a video recording disc is converted into two electrical signals whose differential output controls the offset correction of the light spot on the recording track of the disc, wherein said differential output is restricted or constrained to contain only signals derived from light reflected from the pit portions of the track. By removing those portions of the output caused by light reflected from the land portions located between the pits, the light spot can be controlled to accurately trace the recording track even when the disc is tilted from its rotational axis.

BRIEF DESCRIPTION OF THE DRAWINGS

The present invention will become more readily apparent from the following detailed description taken in conjunction with the accompanying drawings in which:

FIG. 1 is a block diagram of a conventional optical signal reproducing system;

FIGS. 2, 3(a), (b), (c) and 4 are schematic representations for explaining the principles of obtaining information from the deviation of the light spot from the recording track in the conventional system;

FIGS. 10 and 11 are block diagrams of third and fourth embodiments of the invention.

DETAILED DESCRIPTION OF THE PREFERRED EMBODIMENTS

The embodiments of the present invention will now be described in detail with reference to FIGS. 6, 8, 10 and 11. The like characters to those shown in FIG. 1 represent the identical components.

Figure 3A:
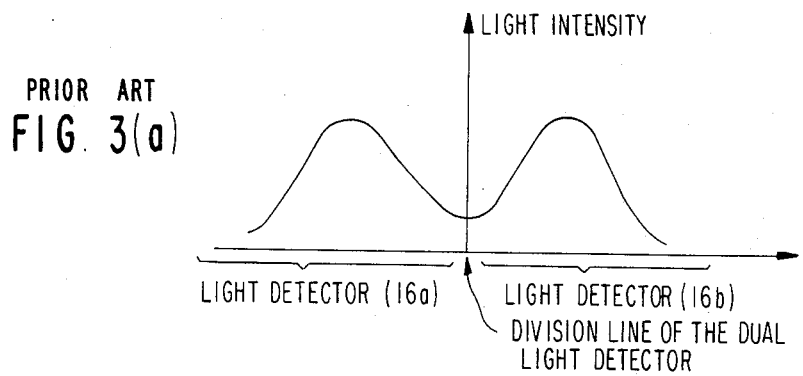
Figure 3B:
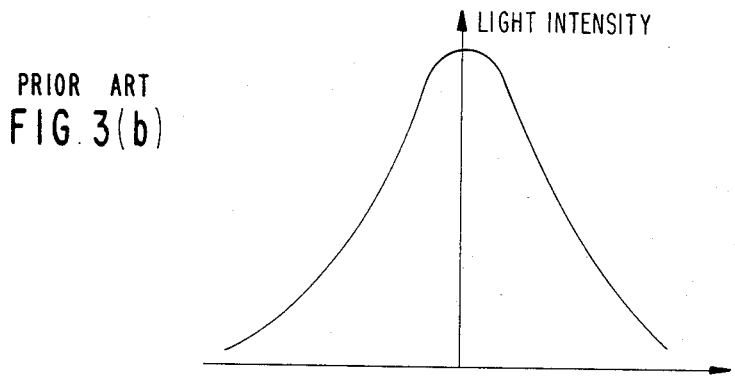
Figure 3C:
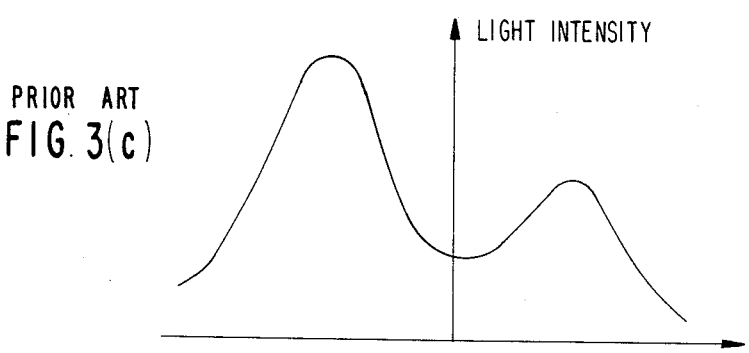
Figure 4:
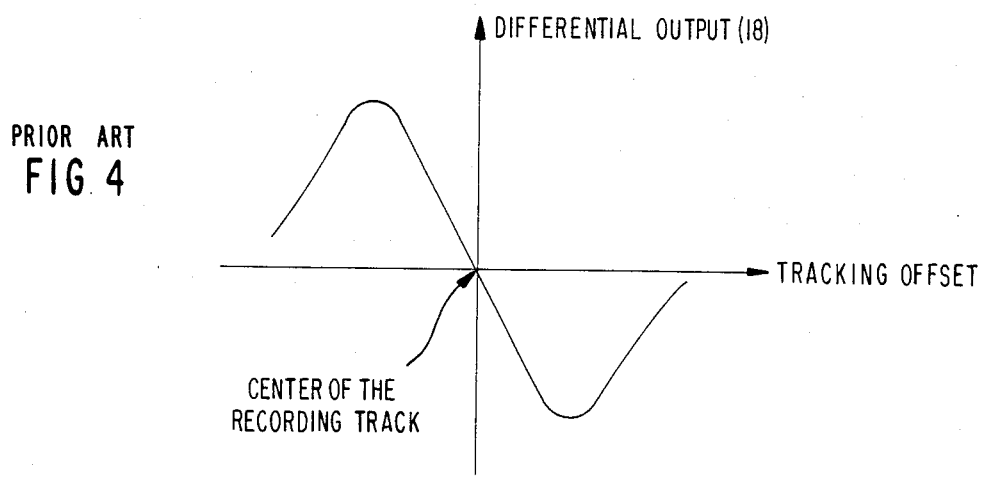
Figure 5A:
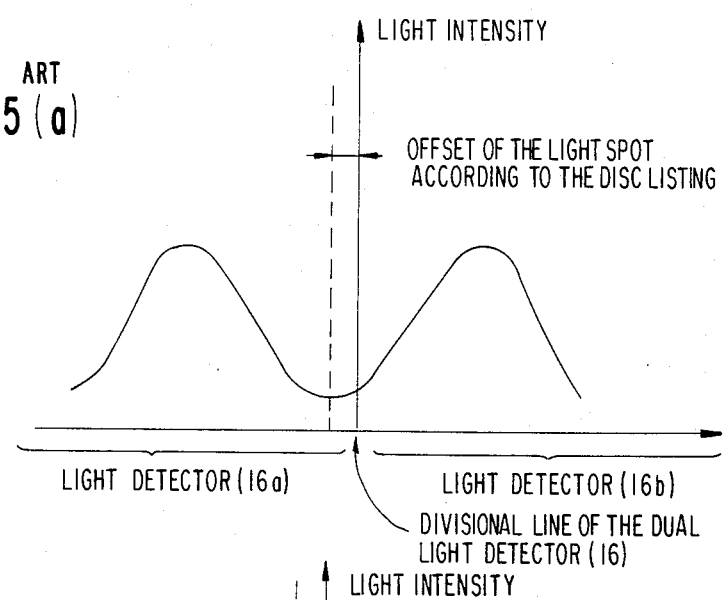
FIGS. 5(a), (b) and (c) are schematic representations for explaining the light intensity distributions on the dual optical detector when the recording disc is tilted in the conventional system.
Figure 5B:
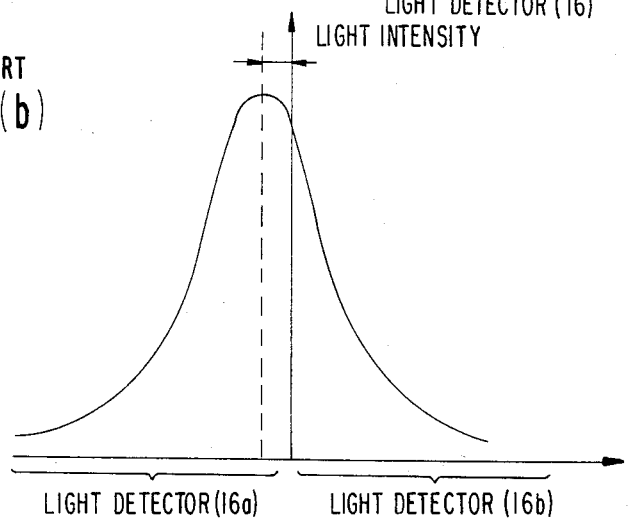
Figure 5C:
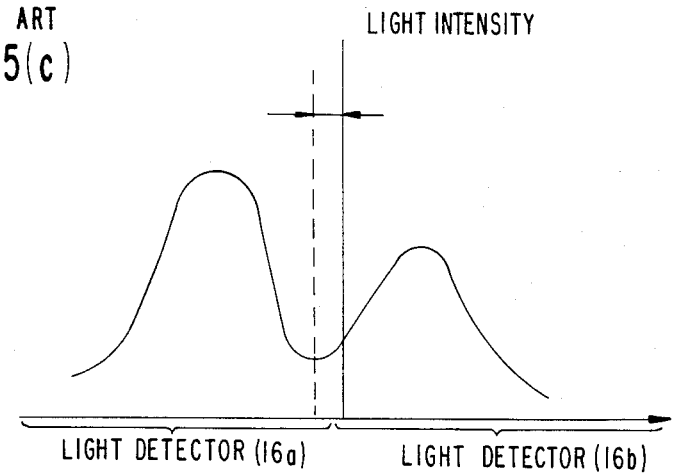
Figure 6:
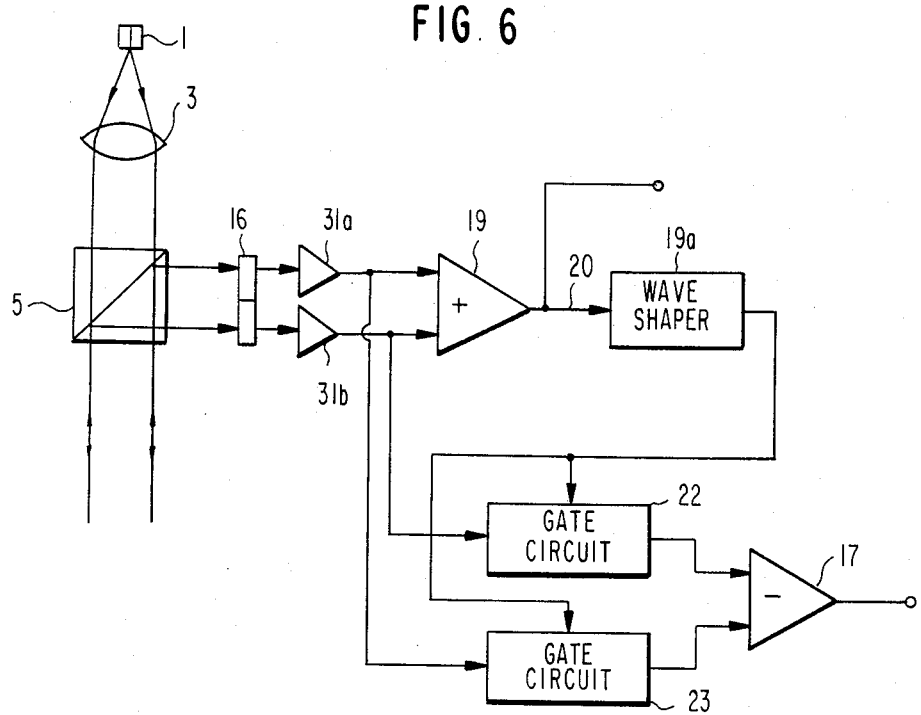
FIGS. 6 and 8 are block diagrams of first and second embodiments according to the present invention.
Figure 7A:
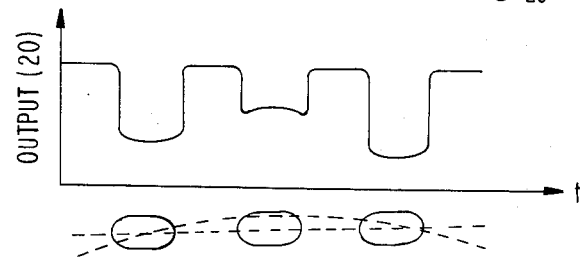
FIGS. 7(a)-(c), and 9(a)-(d) are schematic representations for explaining the operation of FIGS. 6 and 8, respectively.
Figure 7B:
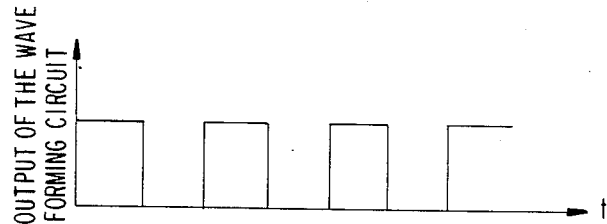
Figure 7C:
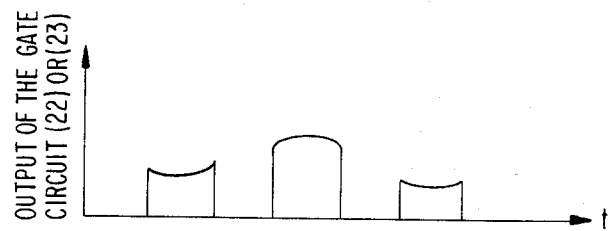

Referring to FIG. 6, laser light generated from a source 1 reflected back from a recording disc (not shown) and polarized through a beam splitter 5 is incident upon a dual optical detector 16. The two halves of detector 16 convert optical signals received by them into respective electric signals. After having been amplified by preamplifiers 31a, 31b the respective electric signals are fed into a summing amplifier 19 whose output wave form is shown in FIG. 7(a), where the curved dotted line represents the locus of the light spot center 10. The amplifier output on line 20 is then transformed by a wave shaper 19a into a pulse signal as shown in FIG. 7(b), and it will be noted that each pulse coincides with the tracking beam being incident on a land rather than a pit. Gate circuits 22, 23 are turned "on" or "off" by the pulse output of the wave shaper 19a. The outputs of preamplifiers 31a, 31b are not supplied to the differential amplifier 17 when the gate circuits 22, 23 are "off" due to the output of the wave shaper 19a being "on", and vice versa, whereby the gate circuits thus generate outputs as shown in FIG. 7(c). In other words, when the gate circuits 22, 23 are "off" with the light spot 10 positioned on a land on the recording track 12 as shown in FIG. 1, the outputs of preamplifiers 31a, 31b are not supplied to the differential amplifier 17, while only when the light spot 10 is positioned in a pit portion of the recording track are the gate circuits turned "on" to supply the outputs of the preamplifiers to the differential amplifier 17.

This results in the differential amplifier 17 generating an output only when the light spot 10 is positioned in the pit portions of the recording track and there is a tracking offset, but no output is generated when the light spot 10 is in the land portions. In this manner tracking correction is always implemented precisely even when the disc is tilted.

Figure 8:
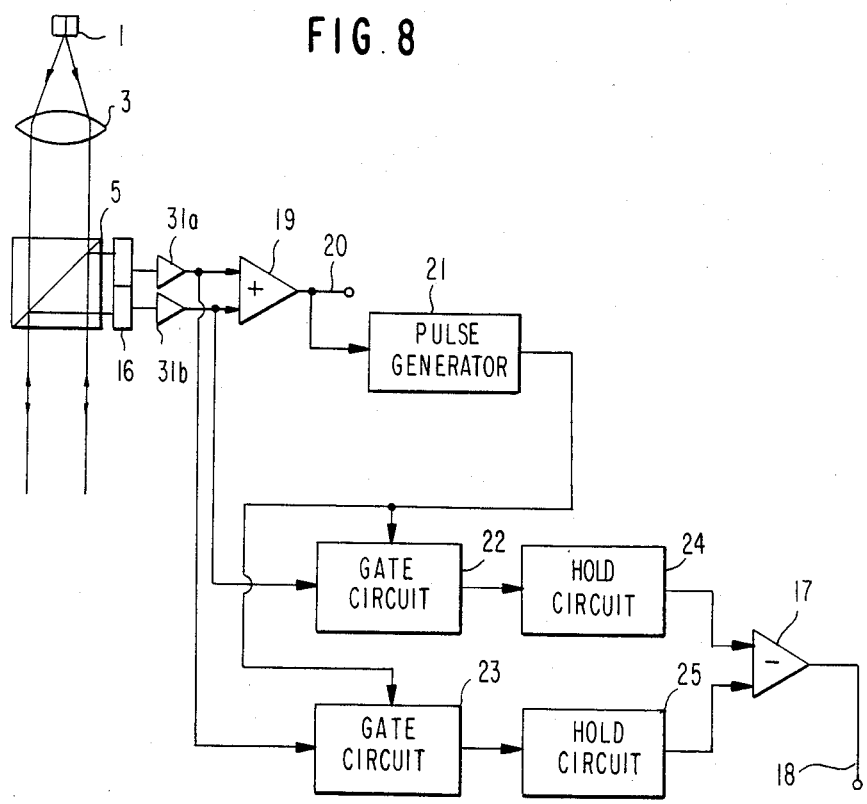
Figure 9A:
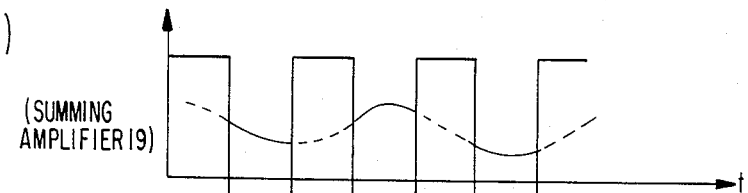
Figure 9B:
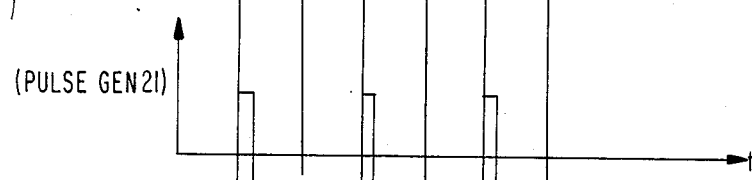
Figure 9C:
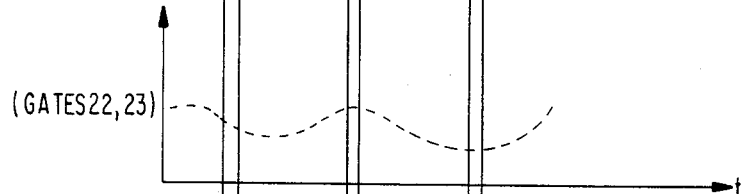
Figure 9D:
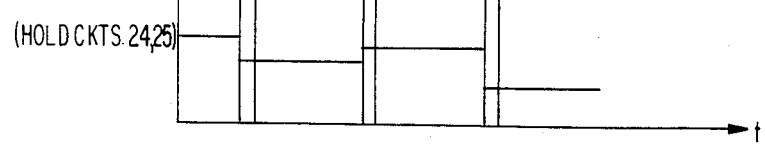

In the embodiment of FIG. 8 a pulse generator 21 generates pulses shorter in width than the pit reproduction signals at the output of summing amplifier 19, as shown in FIGS. 9(a) and 9(b). The gate circuits 22, 23 are thus turned "on" by the output of the pulse generator 21 only during those short intervals when the latter is "on", and are turned "off" throughout the remaining time when the output of the pulse generator 21 is "off", as shown in FIG. 9(c). Hold circuits 24, 25 maintain the outputs of the gate circuits at a substantially constant level, however, as shown in FIG. 9(d), until the pulse generator 21 generates its next output, and the outputs of the hold circuits are then fed to the differential amplifier 17 to produce essentially the same precise tracking effect as in the embodiment of FIG. 6.

In the embodiment of FIG. 10 the differential amplification of the outputs of the preamplifiers 31a, 31b is subsequently gated and held before being delivered to line 18, whereby again tracking offset correction is only controlled by the pit portions of the readout signals to immunize the system against false or erroneous tilt induced corrections.

In the embodiment of FIG. 11 the output of the pulse generator 21 is delayed by a "half-pit traverse" period of time by a delay circuit 26, and the delayed pulses are fed to the gate circuits 22, 23. As a result the hold circuits 24, 25 sample the reproducing signals when the light spot is positioned at the center of the recording track pits, to similarly implement precise lateral tracking offset correction with immunization from disc tilt effects.

What is claimed is:

1. An optical signal reproducing system comprising a record disc (11) having alternating pits (13) and lands in a surface thereof defining an information recording track (12), a light source (1), a collimating lens (9) for focusing light from said source to form a light spot (10) on said record disc, a dual optical detector (16) for converting light bearing information reflected from said disc into electrical signals, summing amplifier means (19) for adding outputs of said dual optical detector, a differential amplifier (17) for producing a differential output from signals received from said dual optical detector, and means (15) responsive to said differential output for controlling the position of said light spot in a direction transverse to said recording track, characterized by: means operatively coupled between an output of said summing amplifier means and said differential amplifier for constraining the output of said differential amplifier to contain only signals derived from light reflected from pits on said record disc, whereby erroneous disc tilt induced lateral tracking offset corrections due to light reflected from lands on said record disc are avoided.

2. An optical signal reproducing system according to claim 1, wherein said costraining means comprises preamplifiers (31a, 31b) responsive to respective outputs of said dual optical detector, a summing amplifier (19) for adding the outputs of said preamplifiers, a wave shaper (19a) for producing an output signal corresponding only to pit derived outputs from said summing amplifier, and gate circuits (22, 23) controlled by said wave shaper for passing outputs of said preamplifiers to said differential amplifier.

3. An optical signal reproducing system according to claim 1, wherein said constraining means comprises a pulse generator (21) for producing pulses corresponding to pit derived portions of said added outputs of said dual optical detector, gate circuits (22, 23) for sampling respective outputs of said dual optical detector in accordance with output pulses of said pulse generator, and holding circuits (24, 25) for retaining sampled outputs of said gate circuits and for supplying said retained outputs to said differential amplifier.

4. An optical signal reproducing system according to claim 3, further comprising means (26) for delaying the output of said pulse generator such that said sampled and retained outputs correspond to signals derived from the centers of said pits.

5. An optical signal reproducing system according to claim 1, wherein said constraining means comprises a pulse generator (21) for producing pulses corresponding to pit derived portions of said added outputs of said dual optical detector, a gate circuit (22) for sampling the output of said differential amplifier in accordance with the output of said pulse generator, and a holding circuit (24) for retaining the sampled output of said gate circuit, said holding circuit output being supplied to said light spot position controlling means.

* * * * *